United States Patent [19]

McCormick

[11] Patent Number: 5,621,373
[45] Date of Patent: Apr. 15, 1997

[54] NON-EXPLOSIVE INITIATOR WITH LINK WIRE ASSEMBLY

[75] Inventor: Larry L. McCormick, Camarillo, Calif.

[73] Assignee: G & H Technology, Inc., Camarillo, Calif.

[21] Appl. No.: 514,804

[22] Filed: Aug. 14, 1995

[51] Int. Cl.$^6$ .......................... H01H 37/00; H01H 85/00; B23Q 1/68; F16D 9/00
[52] U.S. Cl. ............................. 337/1; 337/5; 403/2; 74/2; 137/76
[58] Field of Search .................................. 337/1, 2, 4, 5; 74/2; 137/76; 403/2, 28

[56] References Cited

U.S. PATENT DOCUMENTS

| | | | |
|---|---|---|---|
| 3,163,732 | 12/1964 | Abbott | 74/2 |
| 3,359,804 | 12/1967 | Phillips | 74/2 |
| 3,695,116 | 10/1972 | Baur | 74/2 |
| 3,924,688 | 12/1975 | Cooper | 74/2 |
| 4,906,962 | 3/1990 | Duimstra | 337/239 |
| 5,471,888 | 12/1995 | McCormick | 74/2 |

*Primary Examiner*—Leo P. Picard
*Assistant Examiner*—Stephen T. Ryan
*Attorney, Agent, or Firm*—George J. Netter

[57] ABSTRACT

A link wire (20) arrangement for use in a non-explosive initiator (10) includes a link wire (20) received within a pair of tubes (24,26), each tube having its outer end formed into a loop (28) and its opposite end crimped (30) to physically and electrically secure the tubes to the included link wire (20). The tubes (24,26) are encapsulated within an insulating body (16).

15 Claims, 2 Drawing Sheets

NON-EXPLOSIVE INITIATOR WITH LINK WIRE ASSEMBLY

BACKGROUND

1. Field of the Invention

The present invention relates generally to a motion initiator for a shaft or other object, and, more particularly, to such an initiator which is non-explosive and operates on the electrical destruction of a link wire element.

2. Description of Related Art

There are many situations (e.g. fire fighting systems) which require the initiation of motion of an object or shaft on demand in a precisely timed manner and with high reliability. One approach to solving this problem has been to restrain a spring-loaded member desired to be moved and explosive means are detonated to sever or rupture the restraining means, thereby achieving rapidly timed and precise movement of the member by the spring action. The use of explosive means, however, is not applicable to a wide range of applications in view of the possibility of danger or destruction to surrounding equipment and personnel.

In copending U.S. patent application Ser. No. 08/226,704 filed Apr. 12, 1994, MOTION INITIATOR, by Larry L. McCormick, a pair of substantially semi-cylindrical spool halves are fitted together in a releasable manner along with an insulative body located between the two spool halves to surroundingly secure and restrain a body which is subjected to a force urging movement. A retaining wire is helically wound around the spool halves and ceramic body securing these pieces together in a unitary relationship, one end portion of the retaining wire being held by a link wire anchored in the insulating body and preventing the retaining wire from unwinding to release the spool halves. On electrical actuation a current passes through the link wire causing it to experience breakage, the current causing the tensile strength of the link wire to reduce to such a point that tensile load placed on it by the retaining wire breaks it. In this manner the spool halves and included object or shaft are released enabling its movement. The described prior art initiator is not fully satisfactory in that the link wire found best for this use is of stainless steel construction and has a very small cross-section (e.g., 0.004 inches) which makes it difficult to terminate both electrically and mechanically. For example, effecting electrical connection to the link wire is difficult since due to the wire small cross-section, the heat mass is accordingly small and the wire can be damaged by soldering or other application of heat. Also, despite the small size of the wire, it must still be able to withstand the tensile force exerted by the retaining wire coil which is continuously exerted upon it and which may be exerted upon the link wire for a long period of time. Moreover, to bend or kink the link wire during termination or assembly can result in a weak point that may rupture prematurely.

SUMMARY OF THE INVENTION

A spool initiator with which the present invention is most advantageously employed includes multiple spool halves which are secured together about an object securing the object against reactive movement from an applied force until it is desired to release the object. A retainer wire having inherent spring tension is helically wound about the initiator parts holding the parts to the object. One end of the retainer wire is fixedly secured to a spool half, for example, and the other end after it is wound and placed in tensile condition about the initiator parts is held by a separate link wire. On receiving an electrical current of predetermined value, the link wire will rupture by virtue solely of the tensile strength being placed upon it by the retaining wire coil.

The link wire consists of a stainless steel wire having its two end portions slidingly received within individual hollow tubes also constructed of a stainless steel, the tube dimensions being such that the link wire slides readily therein. The outer end portions of the tubes and link wire received therein are each formed into curved terminations which serves to suitably clamp the wire within the metal tubes physically as well as establish a good electrical connection therebetween. The metal tubes are mounted within an insulative block with the two curved end portions extending outwardly from the block and the link wire between the tubes also extending outwardly of the insulative block. The inner end portions of the metal tubes are crimped to the link wire thereby increasing the electrical connection as well as enhancing the physical retention of the wire within the tubes.

By the described construction there is not only a firm physical securement of the link wire with and to the mounting block, but also an electrical connection can be readily made to the formed outer ends of the tubes whereas previously both of these functions had been less than fully satisfactorily realized. In addition, the overall resistance of the link wire is reduced to a suitably low value requiring correspondingly less electrical power for actuation which increases reliability of operation.

DESCRIPTION OF A PREFERRED EMBODIMENT

Figure 1:
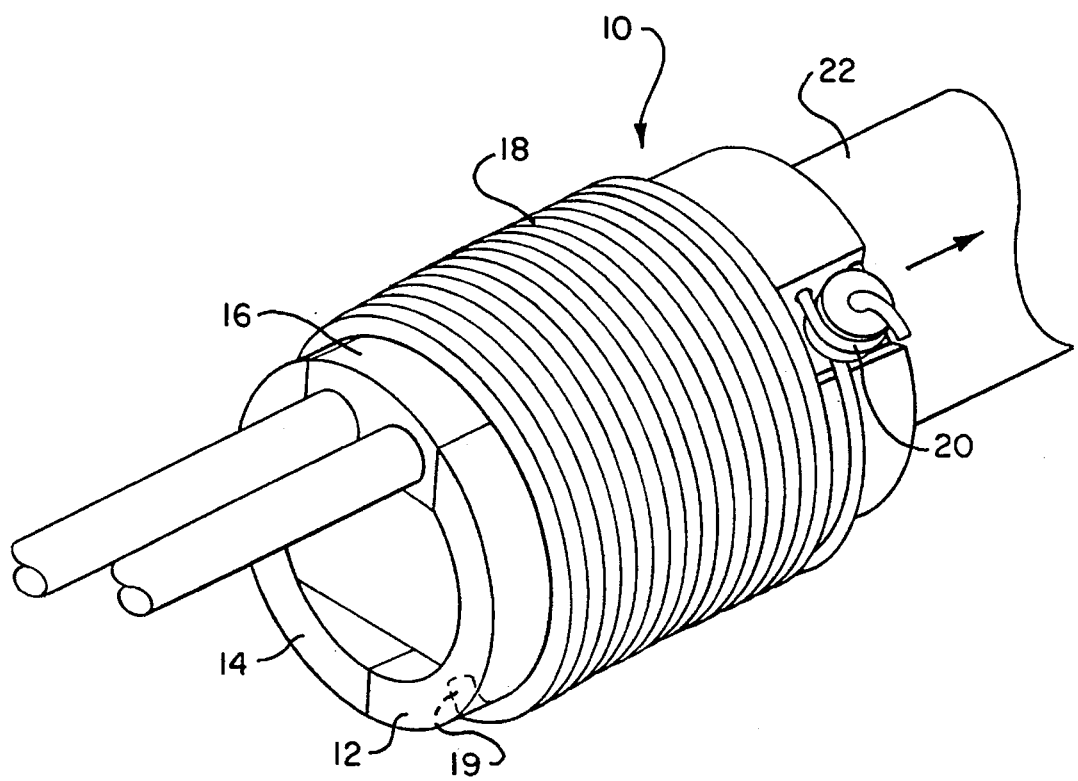
FIG. 1 is a perspective view of a non-explosive, multi-piece motion initiator in connection with which the present invention is most advantageously employed.

Turning now to the drawings, and particularly FIG. 1, there is shown an initiator to be described enumerated overall as 10. The initiator includes a pair of spool means 12 and 14 which are configured so as to form a cylindrical tube when they are assembled together with an insulator body 16. A retaining wire 18 of springlike characteristics is wrapped around the spool halves and insulator body 16 with one end secured to one of the spool halves at 19 and the other end held by a link wire 20. The entire assembly of spool halves insulator body form an internal cavity (not shown) which conforms to the external surface of a body 22 that is placed under a force (arrow) tending to remove the body from initiator 10. However, as long as the retainer wire is maintained in place as shown in FIG. 1, the object 22 is prevented from moving under the direction of the force in the direction shown by the arrow.

As described in the referenced copending McCormick application, when it is desired to release the object 22 an electric current of predetermined magnitude is passed through the high resistance link wire which elevates the temperature of the wire to a value which will cause it to fail to restrain the mechanical preload placed upon it due to the stress failure at an elevated temperature. This newly unrestrained preload is now free to set the forces into motion which will do any desired work.

Figure 2:
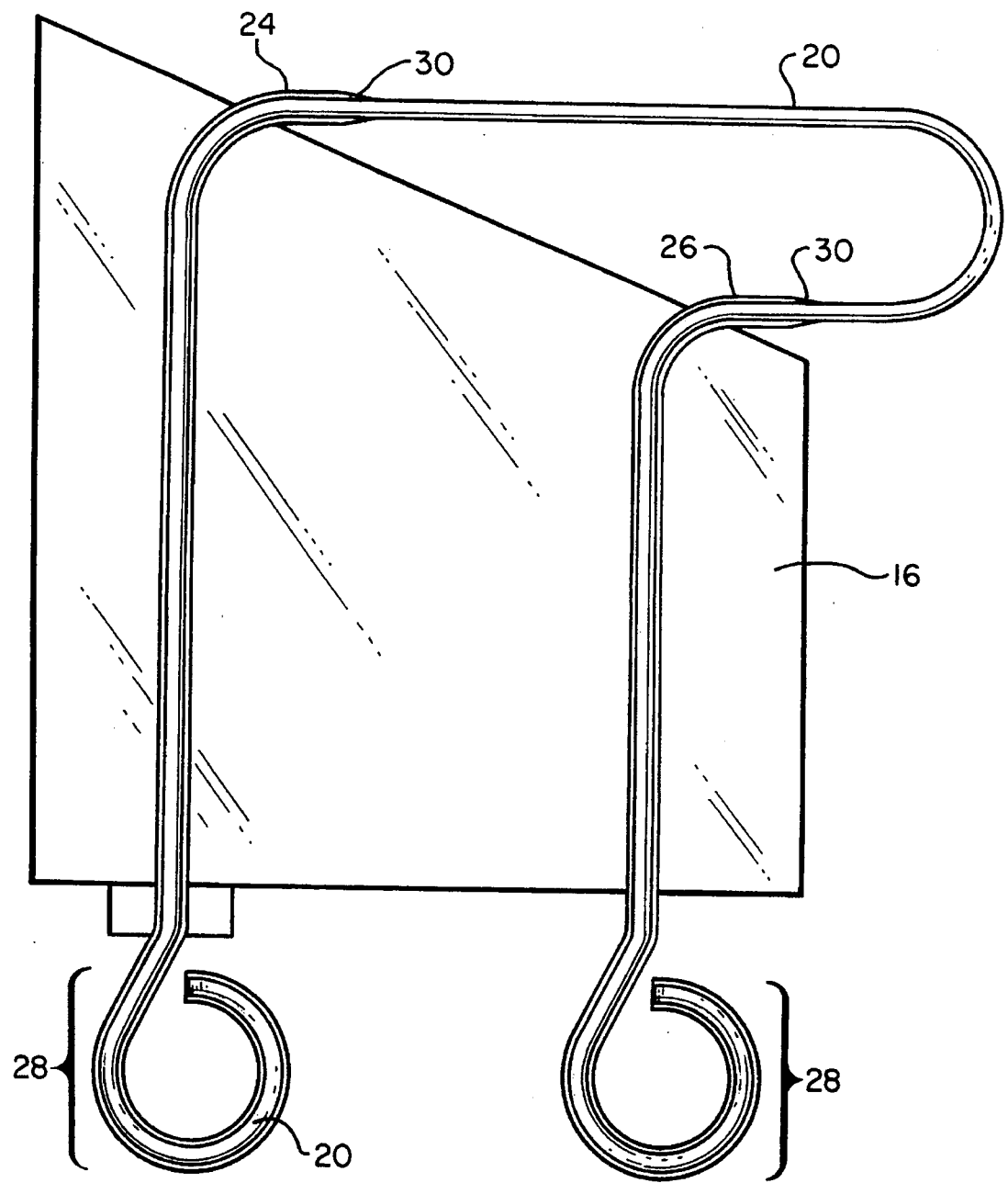
FIG. 2 is an elevational, sectional view showing the link wire assembly of the described invention.

With reference now to FIG. 2, there is shown a sectional view of the insulating body 16 with the link wire 20 in its special mounting arrangement. More particularly, the link wire is seen to include a single unbroken extent of wire which in its preferred form is constructed of stainless steel and has a cross-section, for present purposes, of approximately 0.004 inches. Particularly, the two end portions of the link wire 20 are received within individual lengths of metal tubing 24 and 26, the internal tube diameter being slightly larger than the outer diameter of the wire 20 such that the wire 20 may be slidingly passed through the tube. The two tubes 24 and 26 have their outer ends formed into a loop 28 about the wire 20 which serves to physically trap the ends of the link wire within the tube as well as provide a good electrical connection between the tube and included wire at the same time. Although formation of the loops provides mechanical and electrical connection between the tubes and link, it is preferred that the inner end of each of the tubes 24 and 26 (i.e., that tube end portion adjacent the free link wire) be crimped as at 30 in order to secure that end of the tube also to the link wire in a clamped relation as well as electrically.

It is to be noted that substantially the full length of the tubes 24 and 26 are secured within the insulative body 16 with just the outer end portions of the tubes extending beyond the insulative body, namely, loops 30 and crimped end portions. Preferably, the tubes 24 and 26 are encapsulated within the block 16, but, alternately, the tubes may be secured within the insulating block by other means. It will be noted that the physical contact the retaining wire spring 18 with the link wire 20 takes place between the two inner ends of the tubes 24 and 26.

The described link wire assembly has several distinct advantages over providing a bare link wire which is both physically and electrically mounted and interconnected in a direct and unassisted manner, such as in the copending McCormick application. For example, the physical strength provided by the addition of the metal tubes 24 and 26 is substantial resulting in less possibility of damage to the link wire on mounting and assembly to the insulative block body. Also, the electrical interconnection with the link wire is substantially improved in that a stainless steel wire of that small cross-section is very difficult to interconnect or terminate by soldering, for example, in that it can be easily destroyed by the soldering heat and also can be readily broken if kinked or bent. However, by providing the relatively large loop 28 at the end of each tube 24 and 26, a secure frictional engagement of the link wire is achieved along a substantial extent of the wire rather than over a relatively short distance which spreads out forces applied to the wire maintaining them less apt to damage the link wire.

A still further advantage accruing to the present invention is that when the link wire is merely used by itself, it is relatively long and because of its physical characteristics results in a relatively high electrical resistance value which then requires a commensurately high current in order to produce the desired breaking force of the wire. However, when the major length of the link wire is enclosed within the tubes as described, the overall resistance of the entire link wire assembly drops significantly which is desirable for reasons already given.

In construction of a practical working embodiment of the invention, the link wire 20 was constructed of NEI 17-7 stainless steel wire having a cross-section diameter of 0.004 inches which was positioned within metal tubes constructed of #304 stainless steel having an outer dimension of about 0.016 inches. It was found that with the construction as described, an overall value of 1.0 ohms was obtained with a tolerance of ±0.1 ohms which is an advantageous aspect for quantity production of the invention.

Although the present invention is described in connection with a preferred embodiment, it is to be understood that those skilled in the appertaining art may contemplate changes or modifications that come within the spirit of the invention as it is described and within the ambit of the claims appended hereto.

What is claimed is:

1. Link wire assembly for use in a motion initiator, comprising:

a length of wire;

first and second hollow tubes slidingly received onto respective opposite end portions of the wire, said tubes being of such dimensions that a portion of the wire between facing tube ends is free of said tubes;

outer end portions of the tubes being formed arcuately with the wire therein providing a mechanically clamping and electrical connection; and inner end portions of the tubes being crimped onto the enclosed wire effecting mechanical clamping and electrical connection therebetween.

2. Link wire assembly as in claim 1, in which the tubes are fixedly secured within an insulative body.

3. Link wire assembly as in claim 2, in which the tubes are encapsulated within the insulative body.

4. Link wire assembly as in claim 1, in which the wire and tubes are constructed of stainless steel.

5. Link wire assembly as in claim 1, in which connection of the wire to an electrical power source is made at the tube arcuately formed end portions.

6. Link wire assembly as in claim 4, in which the tubes are fixedly secured within an insulative body.

7. Link wire assembly as in claim 6, in which the tubes are encapsulated within the insulative body.

8. Link wire assembly for use in a nonexplosive electrically actuated object motion initiator, comprising:

a continuous length of wire:

first and second hollow formable electrically conductive tubes slidingly received onto respective opposite end portions of the wire, said tubes being of such dimensions that a portion of the wire between facing tube ends extends freely between said tubes; and outer end portions of the tubes being formed with the wire therein into a substantial curvature providing a mechanically clamping and electrical connection between each tube and the included wire.

9. Link wire assembly as in claim 8, in which the tubes are fixedly secured within an insulative body.

10. Link wire assembly as in claim 9, in which the tubes are encapsulated within the insulative body leaving the wire portion between tube facing ends extending outwardly from the insulative bodies.

11. Link wire assembly as in claim 8, in which the wire and tubes are constructed of stainless steel.

12. Link wire assembly as in claim 8, in which connection of the wire to an electrical power source is made at the tube formed end portions.

13. Link wire assembly as in claim 11, in which the tubes are fixedly secured within an insulative body leaving the wire extending between tube ends outwardly of the insulative body.

14. Link wire assembly as in claim 13, in which the tubes are encapsulated within the insulative body.

15. Link wire assembly as in claim 14, in which tube end portions facing each other along the link wire lying outwardly of the insulating body are secured to the wire by crimping of the tube.

* * * * *